United States Patent
Yamada (10) Patent No.: US 8,671,709 B2
(45) Date of Patent: Mar. 18, 2014

(54) METHOD AND APPARATUS FOR PRODUCING FROZEN PRODUCTS

(75) Inventor: Yoshio Yamada, Yokohama (JP)

(73) Assignee: Technican Co., Ltd., Kanagawa (JP)

( * ) Notice: Subject to any disclaimer, the term of this patent is extended or adjusted under 35 U.S.C. 154(b) by 723 days.

(21) Appl. No.: 12/736,107

(22) PCT Filed: Aug. 11, 2008

(86) PCT No.: PCT/JP2008/064431
§ 371 (c)(1),
(2), (4) Date: Nov. 29, 2010

(87) PCT Pub. No.: WO2009/113191
PCT Pub. Date: Sep. 17, 2009

(65) Prior Publication Data
US 2011/0091619 A1    Apr. 21, 2011

(30) Foreign Application Priority Data
Mar. 11, 2008 (JP) ................................. 2008-061695

(51) Int. Cl.
*F25D 17/02* (2006.01)
(52) U.S. Cl.
USPC ............................................ 62/374; 426/442
(58) Field of Classification Search
USPC ............... 62/374, 375, 376, 378, 63, 64, 442; 426/442
See application file for complete search history.

(56) References Cited

U.S. PATENT DOCUMENTS 5,653,121 A * 8/1997 Yamada .......................... 62/374
5,809,787 A    9/1998 Zittel

FOREIGN PATENT DOCUMENTS

| JP | 63-197862 | 8/1988 |
|---|---|---|
| JP | 04-173075 A | 6/1992 |
| JP | 08-168340 A | 7/1996 |
| JP | 11-103835 A | 4/1999 |
| JP | 2007-267688 | 10/2007 |

OTHER PUBLICATIONS

English Translation of SIPO Office Action dated Mar. 26, 2012 for Chinese Application No. 200880128714.3.
Office Action from SIPO dated Mar. 26, 2012 in Original Chinese Language for Chinese Application No. 200880128714.3.
Australian Office Action dated Dec. 11, 2012 for corresponding Australian Patent Application No. 2008352451.
English Translation of Japanese Office Action dated Jun. 12, 2012 for Japanese Application No. 2008-061695.
Office Action from JPO dated Jun. 12, 2012 in Original Japanese Language for Japanese Application No. 2008-061695.

* cited by examiner

*Primary Examiner* — Melvin Jones
(74) *Attorney, Agent, or Firm* — Farjami & Farjami LLP (57) ABSTRACT

The invention provides a method and an apparatus for producing frozen products using a liquid cooling freezing method, enabling the number of times for replenishing a freezing solvent to be reduced and completely preventing alcoholic odor from occurring. The apparatus 1 for producing frozen products according to the invention includes, in a freezing chamber 2, a freezing tank 3 having a freezing solvent 30 stored therein for immersing therein products and freezing them, gas jetting units 4 for jetting a gas having a temperature of 0° C. or below against the products frozen in the freezing tank 3 to remove the freezing solvent adhering to the products, and a transferring device 5 for transferring the products to be frozen in the freezing chamber 2 in a manner that the products to be frozen are immersed in the freezing solvent 30 in the freezing tank 3 and then lifted from the freezing tank 3 and further the freezing solvent adhering to the products is removed by the gas jetting units 4.

19 Claims, 4 Drawing Sheets

METHOD AND APPARATUS FOR PRODUCING FROZEN PRODUCTS

This is a U.S. national phase application, which is based on, and claims priority from, PCT application Serial No. PCT/JP2008/064431, filed Aug. 11, 2008, which claims priority from foreign application Serial No. 2008-061695, filed Mar. 11, 2008 in Japan.

TECHNICAL FIELD

This invention relates to a method and an apparatus for producing frozen products, suitable for freezing foods, particularly edible meats and the like.

BACKGROUND ART

As a method for freezing foods without causing cell destructions and cracks, the liquid cooling freezing method using a liquid as a freezing medium has been known in the past. In the liquid cooling freezing method, foods are immersed in a freezing solvent (ethanol solution and the like), for example, having a temperature of −20° C. to −35° C. to freeze them so that the foods pass through a temperature zone of the maximum ice crystal formation (0° C. to −5° C.) as rapidly as possible in order to achieve the freezing.

As a liquid cooling freezing type freezing apparatus using such a liquid cooling freezing method, a freezing apparatus has been known, disclosed in, for example, Japanese Patent Application Laid Open No. 2007-267,688. This freezing apparatus comprises a freezing tank having a freezing solvent stored therein, blowers (air blast means) for removing in atmosphere the freezing solvent adhering to foods immersed and frozen in the freezing solvent in the freezing tank, and a conveyor for immersing and freezing the foods in the freezing tank and then taking the foods out of the tank and into the atmosphere and transferring the foods to the blowers.

DISCLOSURE OF THE INVENTION

With the liquid cooling freezing type freezing apparatus of the prior art, however, after products have been frozen to obtain frozen products, the freezing solvent adhering to the frozen products is removed by jetting the air at a temperature of 20° C. to 25° C. higher than the room temperature against the frozen products in atmosphere. Therefore, there is a problem that the temperature of the frozen products somewhat rises during the removal of the freezing solvent. Moreover, since the freezing solvent adhering to the frozen products is removed in the atmosphere which is opened space, the freezing solvent is brought from the freezing tank to the exterior (in atmosphere) to be decreased little by little so that replenishment of the freezing solvent into the freezing tank is frequently required, which is one problem to be solved.

In case using alcohol as the freezing solvent, furthermore, alcoholic odor often occurs when removing the alcohol adhering to the frozen products in the atmosphere.

The present invention has an object to favorably solve the problems of the prior art described above. The method for producing frozen products by freezing the products in a freezing chamber according to the invention comprises a liquid freezing step of immersing said products to be frozen into a freezing solvent in a freezing tank provided in said freezing chamber to freeze said products, a lifting step of lifting said products to be frozen from said freezing tank, and a gas jetting step of jetting a gas having a temperature of 0° C. or below against said lifted products in said freezing chamber to remove the freezing solvent adhering to said products to be frozen.

Moreover, the apparatus for producing frozen products according to the invention is the apparatus for producing frozen products by freezing the products, comprising a freezing chamber, and in said freezing chamber further comprising a freezing tank having a freezing solvent stored therein for immersing therein said products to be frozen and freezing them, gas jetting means for jetting a gas having a temperature of 0° C. or below against said products frozen in said freezing tank to remove the freezing solvent adhering to said products, and transferring means for transferring said products to be frozen in said freezing chamber in a manner that said products to be frozen are immersed into the freezing solvent in said freezing tank and then lifted from said freezing tank and said freezing solvent adhering to said products is removed by means of said gas jetting means.

According to the method for producing frozen products of the invention, the products are frozen by the use of the freezing solvent, for example, having a temperature of −20° C. to −35° C. in the liquid freezing step, thereby enabling the products to be rapidly frozen without occurrence of cell destructions and cracks. In the gas jetting step, moreover, the freezing solvent adhering to the products to be frozen is removed by jetting the gas having a temperature of 0° C. or below against the products in the freezing chamber so that the freezing solvent in the state adhering to the products is never brought out of the freezing chamber, whereby the freezing solvent need not be frequently replenished, with the result that the production cost of the frozen goods can be reduced and further alcoholic odor does not occur even if alcohol is used for the freezing solvent. In comparison with the case that freezing solvent is removed by jetting the air at room temperature against products outside a freezing chamber as the prior art, moreover, the temperature rise of the frozen products can be reduced or completely eliminated. Further, any gas, for example, dried air, nitrogen gas and the like can be used as a gas to be jetted for the purpose of removing the freezing solvent. While the gas can be at any temperature within a range of 0° C. or below, if the temperature lower than that of the freezing solvent in the freezing tank, for example, −40° C. is employed, the temperature of the products frozen in the liquid freezing step using the solvent can be further lowered in the gas jetting step to provide the frozen products at a further lower temperature.

At this point, the method for producing frozen products according to the invention may be carrying out in a manner that in said liquid freezing step, parts of said products are frozen in said freeing tank, and in said gas jetting step, the gas having a temperature of 0° C. or below is jetted to remove the freezing solvent adhering to said products to be frozen in said freezing chamber, while parts of said products not being frozen are frozen. By performing the procedure in this manner, the products to be frozen need not be completely frozen in the freezing tank so that it is allowed to freeze only parts of the products, for example, more than 50%, preferably more than 70%, even more preferably more than 80% of the products in the freezing tank. Therefore, the time for immersing the products in the freezing solvent can be shortened so that the time required for producing the frozen products can also be shortened. Further, the freezing tank can be made in a smaller size so that the amount of used freezing solvent can, be reduced, with the result that the production cost can be decreased and the labor for maintenance operation such as exchange of the freezing solvent and the like can be diminished. When jetting the gas, as the parts of the products have been already frozen, the products can be completely frozen up to their interior without occurrence of cell destructions and cracks as is the case using only the freezing solvent for completely freezing the products. Further, although the temperature of the gas jetted for removal of the freezing solvent can be any one which is 0° C. or below, if it is, for example, −45° C. or below, the products can be completely frozen in a shorter time.

Further, the method for producing frozen products according to the invention may be carrying out in a manner that freezing solvent spraying means are provided around said freezing tank for spraying said freezing solvent onto said products to be frozen, and in said liquid freezing step, parts of said products are immersed in said freezing solvent in said freezing tank, while the freezing solvent is sprayed by said freezing solvent spraying means onto parts of said products not being immersed in said freezing solvent. By carrying out the procedure in this manner, the products to be frozen need not be completely immersed in the freezing solvent in the freezing tank so that the height of the freezing tank can be lowered. As a result of this, the amount of used freezing solvent can be reduced to decrease the production cost and the labor for maintenance operation such as exchange of the freezing solvent.

According to the apparatus for producing frozen products of the invention described above, moreover, products to be frozen can be rapidly frozen by the use of the freezing solvent, for example, having a temperature of −20° C. to −35° C. without occurrence of cell destructions and cracks. Moreover, the freezing solvent adhering to the products is removed by jetting the gas having a temperature of 0° C. or below against the products in the freezing chamber so that the freezing solvent in the state adhering to the products is never brought out of the freezing chamber, whereby the freezing solvent need not be frequently replenished, with the result that the production cost of the frozen goods can be reduced and further alcoholic odor does not occur even if alcohol is used for the freezing solvent. In comparison with the case that freezing solvent is removed by jetting the air at room temperature against products outside a freezing chamber as the prior art, moreover, the temperature rise of the frozen products can be reduced or completely eliminated. Furthermore, the freezing and drying (removal of the freezing solvent) are carried out while the products to be frozen are transferred in the freezing chamber by means of transferring means so that an operator does not directly contact the lower temperature freezing solvent, thereby providing the producing apparatus which is high in safety and devised in consideration of good hygiene. Further, any gas, for example, dried air, nitrogen gas and the like can be used as a gas to be jetted for the purpose of removing the freezing solvent. While the gas can be at any temperature within a range of 0° C. or below, if the temperature lower than that of the freezing solvent, for example, −40° C. is employed, the temperature of the products frozen in the liquid freezing step can be further lowered in the gas jetting step to provide the frozen products having a further lower temperature.

At this point, the apparatus for producing frozen products according to the invention may be constructed in a manner that the size of said freezing tank, transferring speed of said products to be frozen by means of said transferring means and the temperature of said freezing solvent are so designed that said products to be frozen are partly frozen in said freezing tank, and the parts of said products not being frozen are frozen by jetting said gas against said products by means of said gas jetting means. With the apparatus constructed in this manner, it is allowed to freeze only parts of the products, for example, more than 50%, preferably more than 70%, even more preferably more than 80% of the products in the freezing tank, so that the freezing tank can be smaller. Therefore, it is possible to provide the frozen product producing apparatus whose freezing tank is downsized, which is capable of reducing the amount of used freezing solvent and shortening the time required for producing the frozen products.

Furthermore, the apparatus for producing frozen products according to the invention may be provided with recovery means for recovering said freezing solvent removed from said products to be frozen by said gas jetting means and returning the recovered freezing solvent to said freezing tank. By providing the recovery means, the freezing solvent removed from the products by means of the gas jetting means is efficiently recovered and returned to the freezing tank, thereby enabling the freezing solvent to be used repeatedly.

In the apparatus for producing frozen products according to the invention, moreover, said recovering means may be the floor surface of said freezing chamber being downward inclined toward said freezing tank. By constructing the recovery means in this manner, the freezing solvent removed from the products by means of the gas jetting means can be recovered with the aid of the gravity force by the recovery means simply formed by the inclined floor surface of the freezing chamber without providing any other means.

According to the apparatus for producing frozen products of the invention, an inlet and an outlet for transferring said products to be frozen into and out of said freezing chamber may be each provided with a division member for dividing the inside and outside of said freezing chamber such that said products to be frozen can be transferred into and out of said freezing chamber. With this construction, the amounts of the external air flowing into the freezing chamber can be reduced, thereby preventing variation in concentration of the freezing solvent due to the fact that the freezing solvent absorbs the moisture in the atmosphere.

Moreover, the apparatus for producing frozen products according to the invention may be constructed such that freezing solvent spraying means are provided around said freezing tank for spraying said freezing solvent onto said products to be frozen, that the liquid level of said freezing solvent in said freezing tank is so determined that said products to be frozen are partly immersed in said freezing solvent, and that said freezing solvent spraying means are adapted to spray said freezing solvent against the parts of said products not being immersed in said freezing solvent in said freezing tank. With such a construction, it becomes possible to immerse only parts of the products to be frozen, for example, more than 30%, preferably more than 50%, even more preferably more than 75% of the products in the freezing solvent in the freezing tank and to spray the freezing solvent onto the remaining parts of the products not being immersed by means of the freezing solvent spraying means. Therefore, the freezing tank can be downsized so that the amount of the freezing solvent to be used can be reduced.

Other than these, the apparatus for producing frozen products by freezing the products of the invention comprises a freezing chamber, and in said freezing chamber further comprises a freezing solvent spraying tank for spraying a freezing solvent onto said products to be frozen by freezing solvent spraying means, thereby freezing said products, gas jetting means for jetting a gas having a temperature of 0° C. or below against said products frozen in said freezing solvent spraying tank to remove the freezing solvent adhering to said products, and transferring means for transferring said products to be frozen in said freezing chamber in a manner that said products to be frozen are frozen in said freezing solvent spraying tank and then lifted from said freezing solvent spraying tank and said freezing solvent adhering to said products is removed by means of said gas jetting means. With this construction, the freezing solvent need no longer be stored in the freezing tank so that the amount of the freezing solvent to be used for freezing the products can be constrained.

BEST MODE FOR CARRYING OUT THE INVENTION

Figure 1:
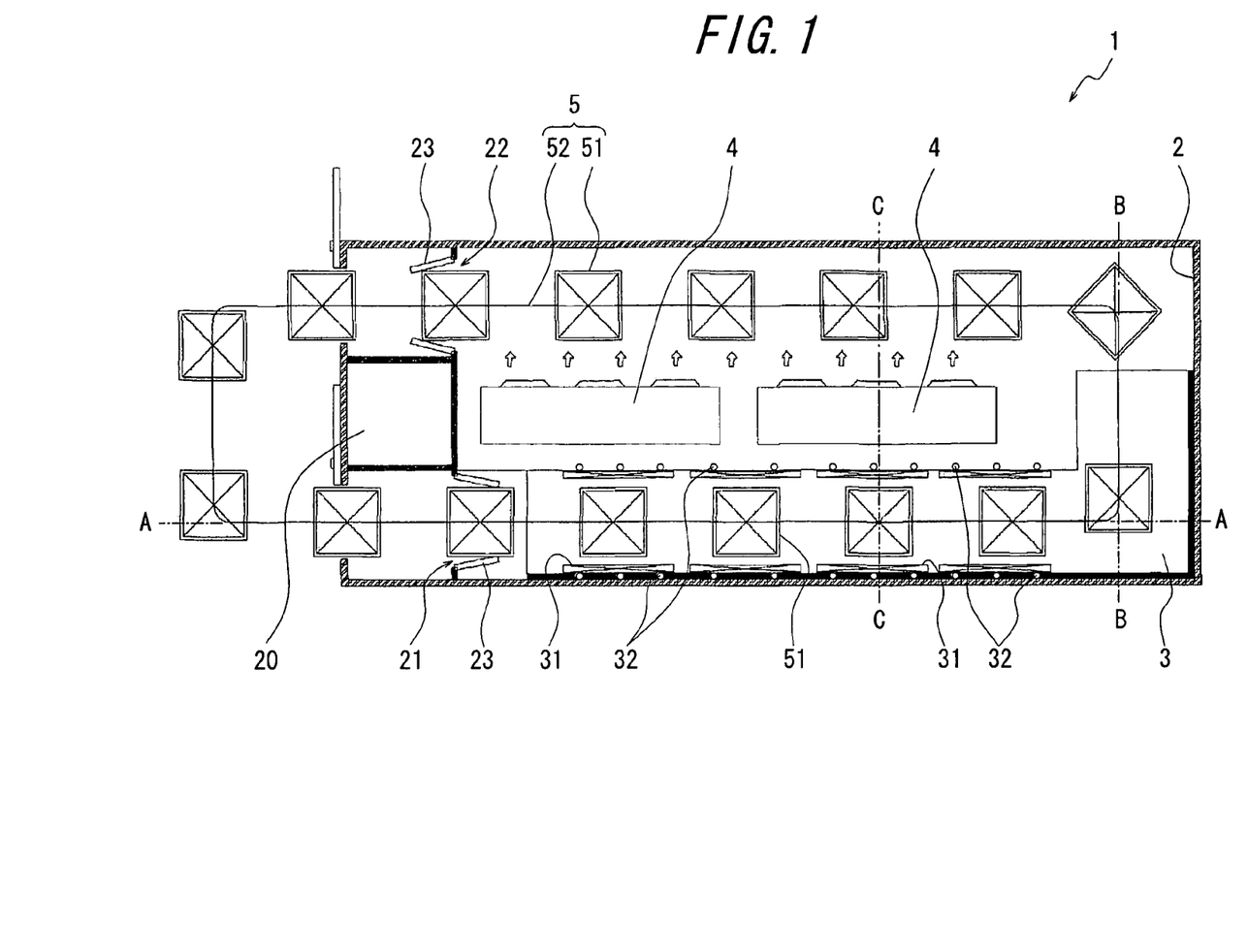
FIG. 1 is an explanatory drawing illustrating an apparatus for producing frozen products in a plan view according to one embodiment of the invention.
Figure 2:
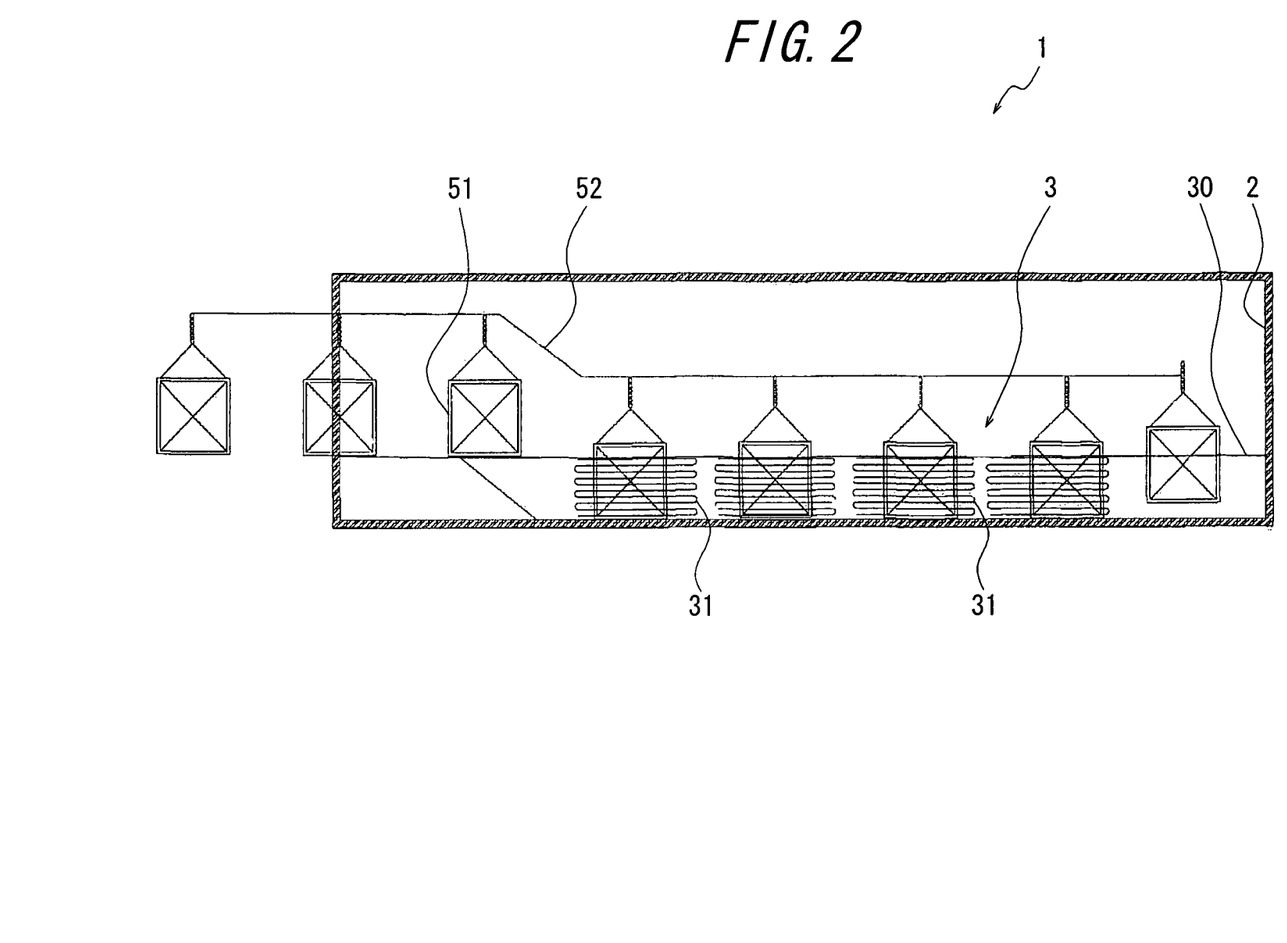
FIG. 2 is a sectional view of the apparatus shown in FIG. 1 taken along its line A-A.
Figure 3:
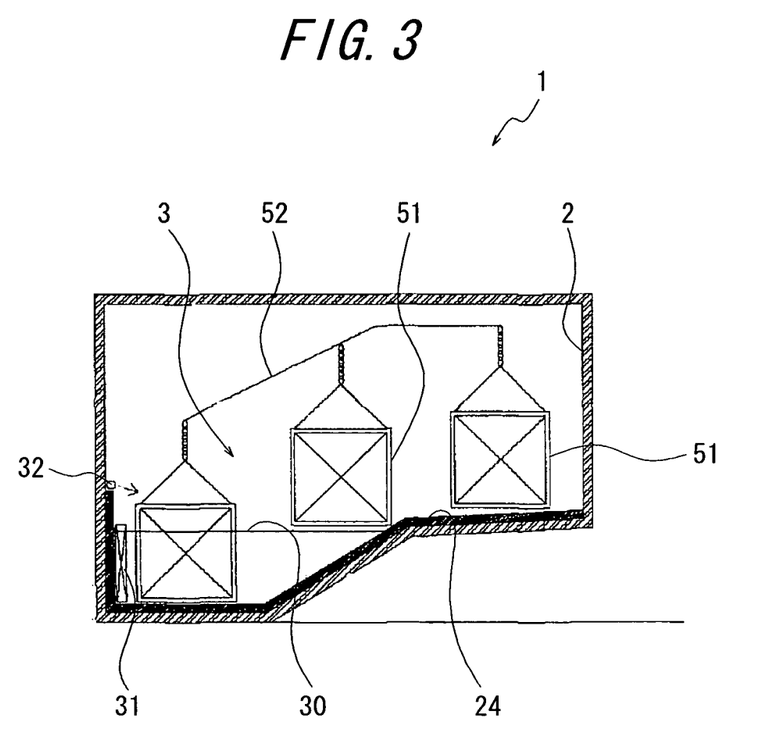
FIG. 3 is a sectional view of the apparatus shown in FIG. 1 taken along its line B-B.
Figure 4:
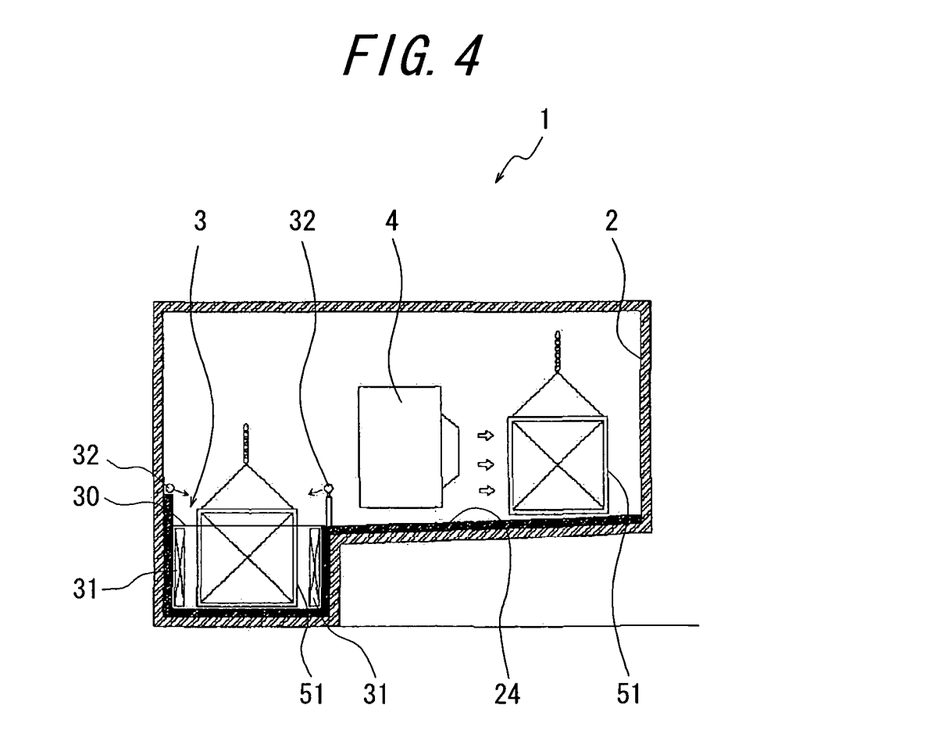
FIG. 4 is a sectional view of the apparatus shown in FIG. 1 taken along its line C-C.

Embodiments of the invention will be explained in detail with reference to the drawings hereinafter. At this point, FIG. 1 is an explanatory drawing illustrating in a plan view an apparatus for producing frozen products according to one embodiment of the invention. FIGS. 2, 3 and 4 illustrate sectional views of the apparatus shown in FIG. 1 taken along lines A-A, B-B, and C-C in FIG. 1, respectively.

As shown in FIGS. 1 to 4, the apparatus 1 for producing frozen products according to the one embodiment of the invention comprises, in a freezing chamber 2, a freezing tank 3, two unit coolers 4 as gas jetting means, and part of gondola 5 as transfer means for producing frozen products by freezing foods to be frozen such as edible meats, fish foods and the like (not shown).

At this moment, the freezing chamber 2 is substantially in the form of a rectangular parallelepiped and has a maintenance space 20 enabling an operator to perform maintenance operation and the like in the freezing chamber 2, and an inlet 21 and an outlet 22 for carrying products to be frozen loaded in cargos 51 of the gondola 5 into and out of the freezing chamber 2. The inlet 21 and the outlet 22 are each provided with a door 23 which is usually pushed to a closed position and freely opened and closed. The freezing tank 3 substantially L-shaped as viewed in a plan view is arranged in the freezing chamber 2 so as to be in contact with wall surfaces of the freezing chamber 2 on lower and right sides when viewed in FIG. 1. The two unit coolers 4 are arranged side by side in the proximity of the center of the freezing chamber 2. As shown in FIGS. 3 and 4, moreover, the floor surface 24 of the freezing chamber 2 is downward inclined toward the freezing tank 3 so that the floor surfaces 24 of the freezing chamber 2 on the side of the freezing tank 3 are lowered. The temperature in the freezing chamber 2 is controlled, for example, at a temperature of −45° C. by means of a temperature regulator (not shown).

The freezing tank 3 is formed by lowering the floor surface 24 of the freezing chamber 2, and in the freezing tank 3 an alcohol (ethanol) solution 30 as a freezing solvent is stored to have a liquid level to an extent that ¾ of the height of the cargos 51 is immersed in the alcohol solution 30. For cooling the ethanol solution 30, moreover, the freezing tank 3 is provided with coolant tubes 31 through which the ethanol solution 30 is cooled by means of a cooling device (not shown) so that the ethanol solution 30 is maintained, for example, at a temperature of about −35° C. Further, the freezing tank 3 is provided therearound with a plurality of shower units 32 as freezing solvent spraying means for spraying the ethanol solution 30 as the freezing solvent. The shower units 32 suck up the ethanol solution 30 in the freezing tank 3 and spray the ethanol solution 30 from the above onto the cargos 51, thereby enabling parts of products in the cargos 51 to be frozen which are not immersed in the ethanol solution 30.

The unit coolers 4 are able to discharge dried air, for example, having a temperature of −45° C. to −60° C. (in upward directions of the drawing as viewed in FIG. 1) against the cargos 51 lifted from the freezing tank 3.

The gondola 5 comprises the cargos 51 for loading the products to be frozen therein, ropes 52 for suspending the cargos 51, and driving means (not shown) for driving the ropes 52 to move the cargos, thereby forming an endless gondola. The ropes 52 serve to transfer the cargos 51 from the outside of the freezing chamber 2 through the inlet 21 into the freezing chamber 2 to immerse the cargos 51 in the alcohol solution 30 in the freezing tank 3 and thereafter to lift the cargos 51 upward so as to expose them to the dried air discharged from the unit coolers 4. Thereafter, the ropes 52 transfer the cargos 51 out of the freezing chamber 2 through the outlet 22. In other words, as shown in FIGS. 1 to 3 the ropes 52 extend substantially in the form of a rectangular shape, part of which is positioned outside the freezing chamber 2 and the passage along which the ropes 52 pass above the freezing tank 3 is located at a lower level than other passages, thereby enabling the cargos 51 to be immersed in the freezing tank 3. Moreover, the driving means (not shown) for driving the ropes 52 is able to adjust the moving speed of the cargos 51 or the products to be frozen.

One example of the procedure for freezing packed foods as products to be frozen by the use of the apparatus 1 for producing frozen products according to the invention will be explained hereafter. First, foods (not shown) are prepared which have been previously packed to prevent the foods from being in direct contact with the alcohol solution 30 in the freezing tank 3. These packed foods are loaded onto the cargos 51 outside the freezing chamber 2. The cargos 51 having the foods loaded therein are transferred into the freezing chamber 2 through the inlet 21 by means of the driving means so that the cargos 51 are immersed in the alcohol solution 30 in the freezing tank 3 up to ¾ of the height of the cargos. While the cargos 51 move in the freezing tank 3, the alcohol solution is sprayed against the parts of the cargos 51 not being immersed in the alcohol solution in the freezing tank 3 by means of the shower units 32, and thereafter the cargos 51 are lifted up away from the freezing tank 3. The moving speeds of the cargos 51 are so designed that the foods are completely frozen in the freezing tank 3. The dried air, for example, having a temperature of −45° C. is jetted from the unit coolers 4 against the lifted cargos 51 to remove the alcohol solution attaching to the foods and cargos 51. The alcohol solution removed by the dried air falls down the wall surfaces and the like of the freezing chamber 2 and flows along the floor surface (inclined surface) 24 so as to be returned and recovered into the freezing tank 3, while the frozen products are transferred out of the freezing chamber 2 through the outlet 22.

According to the apparatus 1 for producing frozen products of one embodiment of the invention using the freezing procedure described above, first the products to be frozen are frozen in the freezing tank 3 by the alcohol solution having a temperature of −35° C. without causing any cracks and cell destructions, thereby enabling good frozen products to be produced which do not cause any drips (i.e. meat juice) and the like when thawing the frozen products. Moreover, since the dried air at a low temperature is jetted against the frozen products to remove the alcohol solution adhering to the products, the adhering alcohol solution can be removed while the temperature of the frozen products is further lowered. Further, the shower units 32 are provided so that there is no need to immerse the whole cargos 51 into the alcohol solution 30 in the freezing tank 3, and the alcohol solution adhering to the products and brought out from the freezing tank 3 is recovered into the freezing tank 3 again with the aid of the inclined surface 24 so that the amount of the alcohol solution 30 used in the freezing tank 3 can be minimized. In this manner, the freezing tank 3 can be downsized and the amount of the used alcohol solution can be reduced, with the result that the amount of liquid required in the freezing tank 3, the lengths of the coolant tubes 31, and the electric power can be decreased to reduce the manufacturing and operating costs, and further to reduce the labor of maintenance operation for the apparatus.

Moreover, with the apparatus 1 for producing frozen products, the operations for freezing the products and removing the freezing solution (alcohol solution 30) are automatically carried out in the freezing chamber 2 so that there is no danger such as an operator being in contact with the low-temperature alcohol solution. Further, the apparatus 1 is superior in the aspect of good hygiene. Furthermore, as the alcohol solution is never brought out of the freezing chamber 2, the number of times of replenishment of the alcohol solution can be reduced. Moreover, as the inlet 21 and the outlet 22 are each provided with the door 23, it is possible to prevent alcoholic odor from occurring in the proximity of the apparatus 1 and also prevent any variation in concentration of the alcohol solution 30 due to absorption of moisture into the alcohol solution 30.

As another example of the freezing procedure for freezing foods as products to be frozen by the use of the apparatus 1, the following steps may be used. In more detail, in the procedure described above the moving speed of the cargos 51 is so adjusted that the foods are frozen from their surfaces inwardly up to their parts of approximately 80% in the freezing tank 3, and dried air, for example, having a temperature of −45° C. is jetted by the unit coolers 4 against the cargos 51 lifted from the freezing tank 3, thereby not only removing the alcohol solution adhering to the foods and cargos 51 but also freezing the center portions of the foods which have not been frozen in the freezing tank 3.

In the case of producing the frozen products according to this procedure, in addition to the effects obtained by the procedure as described earlier, it becomes possible to carry out the freezing of parts of products and removal of the alcohol solution adhering to the products, simultaneously, thereby enabling the time required to produce the frozen products to be shortened (for example, to about half of the time of the case that the products are completely frozen in the freeing tank 3) and at the same time enabling the freezing tank 3 to be downsized (for example, to about ¼ of the case that the products are completely frozen in the freezing tank 3). On this occasion, unfrozen parts of the products are frozen by heat transmission through the alcohol solution adhering to the products to be frozen and parts of the products already frozen in a solid state, both these having high thermal conductivities, so that the freezing can be rapidly performed.

The frozen product producing apparatus 1 which is one embodiment of the invention and the frozen product producing method using the apparatus 1 have been explained in the above with reference to the drawings. However, the invention is not limited to these embodiments. For example, products to be frozen may be brought into direct contact with the freezing solvent without being packed. Moreover, as means for transferring the products to be frozen, any other suitable means may be used, for example, a belt conveyer, lift, and the like. Further, as the freezing solvent, any other solvents may be used such as calcium chloride solution and the like, and as the gas jetted against the products to be frozen, any other gasses may be used, for example, nitrogen gas and the like.

Moreover, the proportion of parts to be frozen to the remaining parts of the products in the freezing tank can be optionally selected. For example, if 50% is selected, the time for immersing the products to be frozen in the freezing tank can be further shortened. On the other hand, in the case of, for example, 80% to 100% of products being frozen in the freezing tank, the possibility for occurrence of cracks and cell destructions can be securely decreased. Moreover, in accordance with the proportion of the parts of products to be frozen and the like, the size of the freezing tank, the moving speed of the products effected by the transferring means, the temperature of the freezing solvent, and the temperature of the gas to be jetted may be adjusted. Further, the products may be frozen by merely spraying the freezing solvent onto the products by means of freezing solvent spraying means instead of immersion of the products in the freezing solvent without providing the freezing tank. In this manner, the amount of the freezing solvent to be used can be decreased. Further, as the method for recovering the freezing solvent, any other method may be used. For example, the freezing solvent removed from the products to be frozen is collected and returned into the freezing tank by a pump.

Industrial Applicability

According to the method for producing frozen products of the invention, the products are frozen by the use of the freezing solvent, for example, having a temperature of −20° C. to −35° C. in the liquid freezing step, thereby enabling the products to be rapidly frozen without occurrence of cell destructions and cracks. In the gas jetting step, moreover, the freezing solvent adhering to the products to be frozen is removed by jetting the gas having a temperature of 0° C. or below against the products in the freezing chamber so that the freezing solvent in the state adhering to the products is never brought out of the freezing chamber, whereby the freezing solvent need not be frequently replenished, with the result that the production cost of the frozen goods can be reduced and further alcoholic odor does not occur even if alcohol is used for the freezing solvent. In comparison with the case that freezing solvent is removed by jetting the air at room temperature against products outside a freezing chamber as the prior art, moreover, the temperature rise of the frozen products can be reduced or completely eliminated. Further, any gas, for example, dried air, nitrogen gas and the like can be used as a gas to be jetted for the purpose of removing the freezing solvent. While the gas can be at any temperature within a range of 0° C. or below, if the temperature lower than that of the freezing solvent in the freezing tank, for example, −40° C. is employed, the temperature of the products frozen in the liquid freezing step can be further lowered in the gas jetting step to provide the frozen products at a further lower temperature.

According to the apparatus for producing frozen products of the invention, moreover, products can be rapidly frozen by the use of the freezing solvent, for example, having a temperature of −20° C. to −35° C. without occurrence of cell destructions and cracks. Moreover, the freezing solvent adhering to the frozen products is removed by jetting the gas having a temperature of 0° C. or below against the frozen products in the freezing chamber so that the freezing solvent in the state adhering to the products is never brought out of the freezing chamber, whereby the freezing solvent need not be frequently replenished, with the result that the production cost of the frozen goods can be reduced and further alcoholic odor does not occur even if alcohol is used for the freezing solvent. In comparison with the case that freezing solvent is removed by jetting the air at room temperature against products outside a freezing chamber as the prior art, moreover, the temperature rise of the frozen products can be reduced or completely eliminated. Furthermore, the freezing and drying (removal of the freezing solvent) are carried out while the products to be frozen are transferred in the freezing chamber by means of transferring means so that an operator does not directly contact the lower temperature freezing solvent, thereby providing the producing apparatus which is high in safety and devised in consideration of good hygiene. Further, any gas, for example, dried air, nitrogen gas and the like can be used as a gas to be jetted for the purpose of removing the freezing solvent. While the gas can be at any temperature within a range of 0° C. or below, if the temperature lower than that of the freezing solvent, for example, −40° C. is employed, the temperature of the products frozen in the liquid freezing step can be further lowered in the gas jetting step to provide the frozen products at a further lower temperature.

The invention claimed is:

1. A method for producing frozen products by freezing the products in a freezing chamber, comprising:
   a liquid freezing step of immersing said products to be frozen into a freezing solvent in a freezing tank provided in said freezing chamber to freeze said products,
   a lifting step of lifting said products to be frozen from said freezing tank, and
   a gas jetting step of jetting a gas having a temperature of 0° C. or below against said lifted products in said freezing chamber to remove the freezing solvent adhering to said products to be frozen;
   wherein in said liquid freezing step, parts of said products are frozen in said freezing tank, and wherein in said gas jetting step, the gas having a temperature of 0° C. or below is jetted to remove the freezing solvent adhering to said products to be frozen in said freezing chamber, while parts of said products not being frozen are frozen.

2. A method for producing frozen products by freezing the products in a freezing chamber, comprising:
   a liquid freezing step of immersing said products to be frozen into a freezing solvent in a freezing tank provided in said freezing chamber to freeze said products,
   a lifting step of lifting said products to be frozen from said freezing tank, and
   a gas jetting step of jetting a gas having a temperature of 0° C. or below against said lifted products in said freezing chamber to remove the freezing solvent adhering to said products to be frozen;
   wherein freezing solvent spraying means are provided around said freezing tank for spraying said freezing solvent onto said products to be frozen, and wherein in said liquid freezing step, parts of said products are immersed in said freezing solvent in said freezing tank, while the freezing solvent is sprayed by said freezing solvent spraying means onto parts of said products not being immersed in said freezing solvent.

3. The method for producing frozen products as claimed in claim 1, wherein:
   freezing solvent spraying means are provided around said freezing tank for spraying said freezing solvent onto said products to be frozen, and
   in said liquid freezing step, parts of said products are immersed in said freezing solvent in said freezing tank, while the freezing solvent is sprayed by said freezing solvent spraying means onto parts of said products not being immersed in said freezing solvent.

4. An apparatus for producing frozen products by freezing the products, comprising:
   a freezing chamber comprising:
      a freezing tank having a freezing solvent stored therein for immersing therein said products to be frozen and freezing them,
      gas jetting means for jetting a gas having a temperature of 0° C. or below against said products frozen in said freezing tank to remove the freezing solvent adhering to said products, and
      transferring means for transferring said products to be frozen in said freezing chamber in a manner that said products to be frozen are immersed into the freezing solvent in said freezing tank and then lifted from said freezing tank and said freezing solvent adhering to said products is removed by means of said gas jetting means;
   wherein the size of said freezing tank, transferring speed of said products to be frozen by means of said transferring means and the temperature of said freezing solvent are so designed that said products to be frozen are partly frozen in said freezing tank, and wherein the parts of said products not being frozen are frozen by jetting said gas against said products by means of said gas jetting means.

5. An apparatus for producing frozen products by freezing the products, comprising:
   a freezing chamber comprising:
      a freezing tank having a freezing solvent stored therein for immersing therein said products to be frozen and freezing them,
      gas jetting means for jetting a gas having a temperature of 0° C. or below against said products frozen in said freezing tank to remove the freezing solvent adhering to said products, and
      transferring means for transferring said products to be frozen in said freezing chamber in a manner that said products to be frozen are immersed into the freezing solvent in said freezing tank and then lifted from said freezing tank and said freezing solvent adhering to said products is removed by means of said gas jetting means;
   wherein recovery means is further provided for recovering said freezing solvent removed from said products to be frozen by said gas jetting means and returning the recovered freezing solvent to said freezing tank.

6. The apparatus for producing frozen products as claimed in claim 4, wherein:
   recovery means is further provided for recovering said freezing solvent removed from said products to be frozen by said gas jetting means and returning the recovered freezing solvent to said freezing tank.

7. The apparatus for producing frozen products as claimed in claim 6, wherein:
   said recovering means is the floor surface of said freezing chamber being downward inclined toward said freezing tank.

8. An apparatus for producing frozen products by freezing the products, comprising:
   a freezing chamber comprising:
      a freezing tank having a freezing solvent stored therein for immersing therein said products to be frozen and freezing them, gas jetting means for jetting a gas having a temperature of 0° C. or below against said products frozen in said freezing tank to remove the freezing solvent adhering to said products, and transferring means for transferring said products to be frozen in said freezing chamber in a manner that said products to be frozen are immersed into the freezing solvent in said freezing tank and then lifted from said freezing tank and said freezing solvent adhering to said products is removed by means of said gas jetting means;

wherein an inlet and an outlet for transferring said products to be frozen into and out of said freezing chamber are each provided with a division member for dividing the inside and outside of said freezing chamber such that said products to be frozen can be transferred into and out of said freezing chamber.

9. The apparatus for producing frozen products as claimed in claim 4, wherein:
an inlet and an outlet for transferring said products to be frozen into and out of said freezing chamber are each provided with a division member for dividing the inside and outside of said freezing chamber such that said products to be frozen can be transferred into and out of said freezing chamber.

10. The apparatus for producing frozen products as claimed in claim 5, wherein:
an inlet and an outlet for transferring said products to be frozen into and out of said freezing chamber are each provided with a division member for dividing the inside and outside of said freezing chamber such that said products to be frozen can be transferred into and out of said freezing chamber.

11. The apparatus for producing frozen products as claimed in claim 6, wherein:
an inlet and an outlet for transferring said products to be frozen into and out of said freezing chamber are each provided with a division member for dividing the inside and outside of said freezing chamber such that said products to be frozen can be transferred into and out of said freezing chamber.

12. The apparatus for producing frozen products as claimed in claim 7, wherein:
an inlet and an outlet for transferring said products to be frozen into and out of said freezing chamber are each provided with a division member for dividing the inside and outside of said freezing chamber such that said products to be frozen can be transferred into and out of said freezing chamber.

13. An apparatus for producing frozen products by freezing the products, comprising:
a freezing chamber comprising:
a freezing tank having a freezing solvent stored therein for immersing therein said products to be frozen and freezing them,
gas jetting means for jetting a gas having a temperature of 0° C. or below against said products frozen in said freezing tank to remove the freezing solvent adhering to said products, and
transferring means for transferring said products to be frozen in said freezing chamber in a manner that said products to be frozen are immersed into the freezing solvent in said freezing tank and then lifted from said freezing tank and said freezing solvent adhering to said products is removed by means of said gas jetting means;
wherein freezing solvent spraying means are provided around said freezing tank for spraying said freezing solvent onto said products to be frozen, the liquid level of said freezing solvent in said freezing tank is so determined that said products to be frozen are partly immersed in said freezing solvent, and wherein said freezing solvent spraying means are adapted to spray said freezing solvent against the parts of said products not being immersed in said freezing solvent in said freezing tank.

14. The apparatus for producing frozen products as claimed in claim 4, wherein:
freezing solvent spraying means are provided around said freezing tank for spraying said freezing solvent onto said products to be frozen,
the liquid level of said freezing solvent in said freezing tank is so determined that said products to be frozen are partly immersed in said freezing solvent, and
said freezing solvent spraying means are adapted to spray said freezing solvent against the parts of said products not being immersed in said freezing solvent in said freezing tank.

15. The apparatus for producing frozen products as claimed in claim 5, wherein:
freezing solvent spraying means are provided around said freezing tank for spraying said freezing solvent onto said products to be frozen,
the liquid level of said freezing solvent in said freezing tank is so determined that said products to be frozen are partly immersed in said freezing solvent, and
said freezing solvent spraying means are adapted to spray said freezing solvent against the parts of said products not being immersed in said freezing solvent in said freezing tank.

16. The apparatus for producing frozen products as claimed in claim 6, wherein:
freezing solvent spraying means are provided around said freezing tank for spraying said freezing solvent onto said products to be frozen,
the liquid level of said freezing solvent in said freezing tank is so determined that said products to be frozen are partly immersed in said freezing solvent, and
said freezing solvent spraying means are adapted to spray said freezing solvent against the parts of said products not being immersed in said freezing solvent in said freezing tank.

17. The apparatus for producing frozen products as claimed in claim 7, wherein:
freezing solvent spraying means are provided around said freezing tank for spraying said freezing solvent onto said products to be frozen,
the liquid level of said freezing solvent in said freezing tank is so determined that said products to be frozen are partly immersed in said freezing solvent, and
said freezing solvent spraying means are adapted to spray said freezing solvent against the parts of said products not being immersed in said freezing solvent in said freezing tank.

18. The method for producing frozen products as claimed in claim 1, wherein the temperature of the gas is lower than a temperature of the freezing solvent in the freezing tank.

19. The apparatus for producing frozen products as claimed in claim 4, wherein the temperature of the gas is lower than a temperature of the freezing solvent in the freezing tank.

* * * * *